(12) United States Patent
Seo et al.

(10) Patent No.: US 12,716,663 B2
(45) Date of Patent: Aug. 25, 2026

(54) COATING COMPOSITION, COATING FILM, AND MICRO CHANNEL TYPE HEAT EXCHANGER USING THE SAME

(71) Applicant: LG ELECTRONICS INC., Seoul (KR)

(72) Inventors: Donghyun Seo, Seoul (KR); Younghwan Ko, Seoul (KR); Yeol Lee, Seoul (KR); Minsoo Kim, Seoul (KR); Hyeok-jin Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 18/783,257

(22) Filed: Jul. 24, 2024

(65) Prior Publication Data

US 2025/0035390 A1 Jan. 30, 2025

(30) Foreign Application Priority Data

Jul. 27, 2023 (KR) ........................ 10-2023-0098335

(51) Int. Cl.
*F28F 19/04* (2006.01)
*C09D 5/08* (2006.01)
*C09D 133/08* (2006.01)

(52) U.S. Cl.
CPC .............. *F28F 19/04* (2013.01); *C09D 5/084* (2013.01); *C09D 133/08* (2013.01); *F28F 2245/02* (2013.01); *F28F 2260/02* (2013.01)

(58) Field of Classification Search
CPC .... F28F 19/04; F28F 2245/02; F28F 2260/02; C09D 5/084; C09D 133/08
USPC .......................................................... 165/133
See application file for complete search history.

(56) References Cited

U.S. PATENT DOCUMENTS 10,676,632 B2 * 6/2020 Umeda .................. F28F 13/18
11,359,288 B2 * 6/2022 Takami .................. C23C 22/34
12,247,790 B2 * 3/2025 Ozaki ................. F28D 20/0034
2011/0263613 A1 * 10/2011 Hendrickson ........ A61K 9/4858 548/131
2012/0288634 A1 * 11/2012 Matsui .................. C09D 5/084 427/388.1
2013/0274299 A1 * 10/2013 Abraham ............ C07D 403/04 548/131

(Continued)

FOREIGN PATENT DOCUMENTS

JP H07-19776 1/1995
JP H09-296121 11/1997

(Continued)

OTHER PUBLICATIONS

Extended European Search Report dated Nov. 18, 2024 issued in Application No. 24191326.8.

*Primary Examiner* — Claire E Rojohn, III
(74) *Attorney, Agent, or Firm* — KED & Associates, LLP

(57) ABSTRACT

A coating composition, a coating film, and a micro-channel type heat exchanger using the same are disclosed herein. The coating composition contains a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder. Thus, the coating composition provides a coating film that has both long-term corrosion resistance and long-term hydrophilicity.

14 Claims, 4 Drawing Sheets

(56) References Cited

U.S. PATENT DOCUMENTS

| | | | | |
|---|---|---|---|---|
| 2016/0040298 | A1* | 2/2016 | Mizuno | C08K 3/30 148/22 |
| 2016/0060765 | A1 | 3/2016 | Mizuno et al. | |
| 2020/0062969 | A1 | 2/2020 | Chasser et al. | |
| 2023/0092645 | A1* | 3/2023 | Holmgren | C08G 63/78 435/157 |

FOREIGN PATENT DOCUMENTS

| | | |
|---|---|---|
| KR | 10-1061813 | 9/2011 |
| KR | 10-1463050 | 11/2014 |
| KR | 10-2020-0006436 | 1/2020 |

* cited by examiner

COATING COMPOSITION, COATING FILM, AND MICRO CHANNEL TYPE HEAT EXCHANGER USING THE SAME

CROSS-REFERENCE TO RELATED APPLICATION(S)

This application claims priority under 35 U.S.C. § 119 to Korean Patent Application No. 10-2023-0098335, filed in Korea on Jul. 27, 2023, whose entire disclosure is hereby incorporated by reference.

BACKGROUND

1. Field

The present disclosure relates to a coating composition and a coating film that may simultaneously impart a corrosion resistance and a hydrophilic effect to a metal surface of a heat exchanger for heat exchange, and a micro-channel type heat exchanger using the same.

2. Background

A heat exchange system refers to a system provided in an apparatus whose basic mechanism is heat exchange. For example, all of apparatuses such as air conditioners, refrigerators, dehumidifiers, etc. are included in the category of the apparatus equipped with the heat exchange system because they produce target results through heat exchange.

An apparatus typically used in the heat exchange system is a heat exchanger. As the heat exchanger continues to operate, moisture is deposited on a surface of the heat exchanger. For example, the heat exchanger may be used as an evaporator of the air conditioner. In this case, when the air conditioner operates for cooling, a temperature of the evaporator becomes lower than room temperature. As a result, condensate is deposited on the surface of the evaporator.

When the heat exchanger is used for cooling in the summer, the surface temperature of the aluminum fin becomes below the atmospheric dew point, causing water droplets to stick to the surface of the fin. When the water droplets stick to the fin surface, the following three problems occur. First, the aluminum fin becomes susceptible to corrosion. Second, heat exchange efficiency decreases because ventilation resistance increases and thus air volume decreases. Lastly, thirdly, the water droplets on the surface of the fin are sucked into the cooling air and thus scatter indoors or inside the car.

When the hydrophilicity of the fin surface is good, the water adhering to the fin surface may be brought into the form of a water film rather than spherical water droplets. Therefore, in order to solve the above problem, a hydrophilic film is generally formed on the surface of the fin material. Furthermore, for anti-corrosion purposes, a corrosion-resistant film is provided between the fin material and the hydrophilic film.

In this regard, Korea Patent Application Publication No. 10-2020-0006436 (publication date: 2020 Jan. 20) relates to "heat exchange system" and discloses a heat exchange system in which a chemical conversion layer and a hydrophilic coating layer are formed.

However, the above prior art describes that the chemical conversion layer and the hydrophilic coating layer for the antibacterial and odor removal functions of the heat exchange system are formed on an area of the surface of the base material where moisture has a long residence time. Thus, in this prior art, the effect of improving corrosion resistance is insignificant.

Furthermore, Korean Patent No. 10-1463050 (Announcement date: 2014 Nov. 18) relates to "a material including a superhydrophobic surface and a method for preparing the same,". This prior art discloses a method including coating the surface of the material with polydopamine; forming a titanium dioxide layer on the polydopamine coated layer formed on the surface of the material; and coating the titanium dioxide layer with a compound containing fluorine.

However, the above prior art requires three or more layers, including the polydopamine coating layer, the titanium dioxide layer, and the fluorine-containing compound, to be formed on the surface of the material, thereby making the process complicated. Further, there has been no confirmation as to whether the coating layer may be maintained stably in an environment with a large temperature difference, such as an outdoor heat exchanger.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
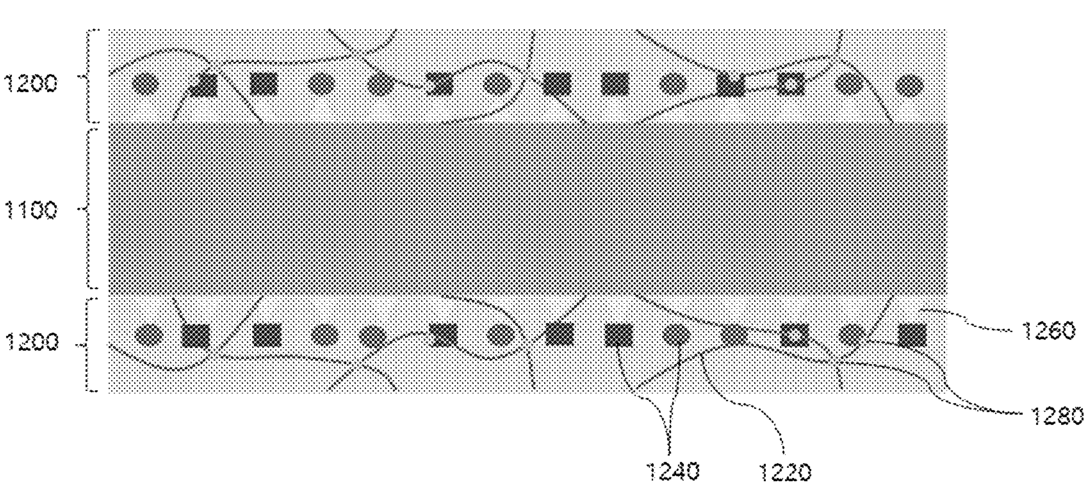
FIG. 1 is a cross-sectional view showing a coating material according to the present disclosure.

Various purposes, features, and advantages will be described in detail later with reference to the attached drawings, so that those skilled in the art in the technical field to which the present disclosure belongs may easily practice the technical ideas of the present disclosure. In describing the present disclosure, when it is determined that a detailed description of the publicly known technology related to the present disclosure may unnecessarily obscure the gist of the present disclosure, the detailed description thereof will be omitted. Hereinafter, a preferred embodiment according to the present disclosure will be described in detail with reference to the attached drawings. In the drawings, identical reference numerals are used to indicate identical or similar components.

Although first, second, etc. are used to describe various components, these components are not limited by these terms. These terms are merely used to distinguish one component from another component. Thus, unless specifically stated to the contrary, the first component may be the second component.

As used herein, the singular constitutes "a" and "an" are intended to include the plural constitutes as well, unless the context clearly indicates otherwise. Further, the terms "comprise", "comprising", "include", and "including" as used herein should not be construed as necessarily including all of various components or steps as described herein, and may be construed as excluding some components or some steps thereof. It will be further understood that the terms "comprise", "comprising", "include", and "including" as used herein specify presence of a component or a step, but do not preclude the presence or addition of another component or step.

Hereinafter, a coating composition and a coating film that may simultaneously impart a corrosion resistance and a hydrophilic effect to a metal surface of a heat exchanger for heat exchange, and a micro-channel type heat exchanger using the same will be described.

First, the coating composition according to the present disclosure is described. The coating composition of the present disclosure may provide a single coating film that has both hydrophilicity and corrosion resistance.

Conventionally, two or more coating films respectively having hydrophilicity and corrosion resistance are formed on a surface of a base material in order to impart the hydrophilicity and corrosion resistance to the surface of the base material. A currently known single coating film is not able to achieve the required long-term hydrophilicity and long-term corrosion resistance.

Accordingly, embodiments disclosed herein provide a new coating composition that may simultaneously satisfy the required long-term hydrophilicity and long-term corrosion resistance. The coating composition may contain a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

A content of each of the components in the coating composition as described above refers to a weight range of a liquid state thereof before the composition is dried. A composition of each of the component included in the composition may be determined based on a binding energy between the components. As the contents of the cross-linking agent, the hydrophilic agent, and the corrosion resistance agent increase in this order, the bond energy may be higher.

Specifically, each of the components of the composition has unique binding energy depending on a chemical structure thereof. The higher the binding energy, the higher the binding strength. Therefore, in order for the coating film made of the composition to have sufficient bonding strength, the content of the crosslinking agent should be the highest, followed by the content of the hydrophilic agent and then the content of the corrosion resistance agent. As a result, in order to determine the content of each component of the composition, the binding energy of the components included in the composition is calculated to determine the optimized content of each of the components.

Furthermore, in order to ensure mass production of the product, the composition used to manufacture the coating film should have appropriate viscosity. A minimum value of 20 cPs thereof should be secured. When the viscosity is low, it may be difficult to achieve uniform coating and secure a coating amount.

In addition, when a surface temperature of the aluminum fin provided in the heat exchanger falls below the atmospheric dew point, the water droplets stick to the surface of the fin, which causes the aluminum fin to corrode. Further, the ventilation resistance increases such that the air volume decreases, and thus heat exchange efficiency decreases. Further, the water droplets on the fin surface are sucked into the cooling air which in turn scatter indoors or inside the car.

In order to solve the above-described problem, generally, a hydrophilic film may be formed on the surface of the fin material, and a corrosion-resistant film for corrosion resistance may be provided between the fin material and the hydrophilic film. As mentioned above, conventionally, a two-step coating process including a step to form a hydrophilic coating film and a step to form a corrosion-resistant coating film is used.

In the above-described prior art, the corrosion-resistant and hydrophilic films are formed respectively. In particular, the corrosion-resistant coating film does not have hydrophilic performance. Thus, so long-term hydrophilicity and long-term corrosion resistance are reduced, which may shorten the performance and lifespan of the product. In addition, the process of forming the two coating films respectively reduces mass productivity and requires a high cost.

The coating composition according to the embodiments disclosed herein may provide a single coating film that has both corrosion resistance and hydrophilic properties, thereby improving product performance and lifespan at low cost. In other words, the coating composition according to the embodiments disclosed herein may be subjected to one coating and drying process on the surface of the base material to form the coating film with excellent hydrophilicity and corrosion resistance.

Furthermore, in the coating composition according to the embodiments, the metal compound may impart the corrosion resistance to the surface of the base material, and the phosphate-based compound may strongly bind the metal compound to the base material to strengthen the corrosion resistance. Furthermore, the composition may include the cross-linking agent having an amide group to strongly cross-link the corrosion resistant agent and the hydrophilic agent to each other, and furthermore, may include the hydrophilic resin.

In this regard, the coating composition may contain 10 to 40% by weight of a hydrophilic resin, and the hydrophilic resin may have a functional group including an acrylic group. The hydrophilic resin may include at least one selected from acrylic acid, methacrylic acid, methyl (meth)acrylate, ethyl (meth)acrylate, butyl (meth)acrylate, dimethylaminoethyl (meth)acrylate, isobutyl (meth)acrylate, t-butyl (meth)acrylate, cyclohexyl (meth)acrylate, ethylhexyl (meth)acrylate, (meth)acrylic ester monomer, 2-hydroxyethyl acrylate, and hydroxyethyl (meth)acrylate.

The content used in the embodiments refer to a weight percent. Furthermore, since the coating film made of the coating composition is in a state in which water has been evaporated and removed therefrom, the content of each of the components of the coating film may change compared to that in the coating composition.

When the content of the hydrophilic resin is smaller than 10% by weight, the hydrophilic effect of the coating film is insignificant, so that there is a problem of deterioration of hydrophilic performance. When the content of the hydrophilic resin exceeds 40% by weight, the content of the metal compound is relatively low compared to the content of the crosslinking agent, such that the corrosion resistance is reduced.

The metal compound is added to impart the corrosion resistance to the coating composition. The metal compound may include at least two metal elements selected from among chromium (Cr), zirconium (Zr), and titanium (Ti). It is most preferable that the metal compound may include zirconium (Zr) or titanium (Ti). In this regard, among the elements of commonly used metal compounds, vanadium (V) is preferably not contained in the composition because the vanadium (V) itself has a unique odor, such that there is a risk of odor generation when using an air conditioner.

The metal compound is added in an amount of 1 to 10% by weight. When the content of the metal compound is smaller than 1% by weight, the coating film may peel off from the base material due to poor bonding between the base material and the coating material. When the content thereof exceeds 10% by weight, the hydrophilicity of the coating film is reduced due to the relatively low content of the hydrophilic resin.

The amide-based crosslinking agent is contained therein to strengthen the durability of the coating film, and the amide-based crosslinking agent is preferably added in an amount of 0.5 to 5% by weight. When the amide-based crosslinking agent is added in an amount of smaller than 0.5% by weight, the bonding strength between the hydrophilic component and the corrosion resistance component is lowered, so that there is a problem that the hydrophilicity cannot be maintained for a long time. When the content thereof exceeds 5% by weight, the effect of strengthening durability is insignificant compared to the amount as added, and the coating film becomes hard due to the high curability of the coating composition.

The amide-based crosslinking agent may include at least one selected from the group consisting of formamide, sodium amide, nicotinic acid amide, dimethylformamide, acetamide, acrylamide, polyacrylamide, potassium amide, oxamide, lithium diethylamide, dimethylformamide, benzamide, iodoacetamide, acetamide, arylamide, phenylacetamide, cyanoacetamide, dicyanoacetamide, dimethylacetamide, diethylchloroacetamide, dimethylformamide, glycinamide, isopropylacrylamide, methacrylamide, methylenebisacrylamide, nicotinamide, oleamide, oxamide, sulfonylamide and thioacetamide.

The phosphoric acid-based compound is used to improve the bonding strength between the base material and the coating film. In accordance with the embodiments disclosed herein, the phosphoric acid-based compound refers to a compound containing phosphoric acid or a phosphate salt. In accordance with the embodiments disclosed herein, the phosphoric acid-based compound may allow the components of the coating film to adhere more strongly to the base material to improve the corrosion resistance and hydrophilicity of the coating film. In particular, because the phosphoric acid-based compound has a strong bonding power with the metal, the composition may be able to be coated on most of metal base materials, including aluminum.

The phosphoric acid-based compound may include one or more selected from the group consisting of phosphoric acid, pyrophosphoric acid, polyphosphoric acid, potassium hydrogen orthophosphate, tetrasodium inorganic phosphate, disodium pyrophosphate, free potassium phosphate, phosphorus pentoxide, zinc phosphate, manganese phosphate, iron phosphate, trimetaphosphoric acid, tripolyphosphoric acid, and tetrapolyphosphoric acid.

The phosphoric acid-based compound is preferably added in an amount of 1 to 5% by weight. When the phosphoric acid-based compound is added in an amount of smaller than 1% by weight, there is a problem that the bonding strength between the metal compound and the metal material is reduced, the durability of the coating film is reduced, such that the possibility of peeling of the coating film off from the base material increases. When the content thereof exceeds 5% by weight, there is a problem that the hydrophilicity and corrosion resistance of the coating film are reduced due to the relatively low content of each of the hydrophilic and corrosion resistance components.

Further, the composition contains 0.1 to 3% by weight of the preservative. The preservative refers to an ingredient that imparts fragrance to the coating film and prevents odor caused by contaminants, etc. Preferably, the preservative may be an organic acid, and may include one or more selected from the group consisting of citric acid, lactic acid, sorbic acid, and combinations thereof. Most preferably, the preservative may include sorbic acid.

Next, the coating film made of the coating composition as described above will be described in detail. The coating film may be formed on the base material, and may be made of the coating composition containing a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

The components of the composition are as described above. In this regard, it is preferable that the coating amount of the coating film may be in a range of 0.10 to 1.50 g/m$^2$, and more preferably, 0.10 to 1.50 g/m$^2$.

When the above coating amount is smaller than 0.10 g/m$^2$, the effect of strengthening the hydrophilicity is small and the amount of the metal compound is small, thereby causing the heat exchanger to corrode due to the reduced corrosion resistance effect. Thus, by-products resulting from the corrosion may be discharged to the outside when the air conditioner operates. When the coating amount thereof exceeds 1.50 g/m$^2$, the bonding strength of the coating film with the base material may be weakened and the coating surface may easily peel off from the heat exchanger surface. Preferably, various types of metal materials, for example, aluminum, copper, stainless steel, nickel, etc. may be used as the base material.

FIG. 1 is a cross-sectional view showing a coating material according to the embodiments disclosed herein. Referring to FIG. 1, a coating material 1000 includes a base material 1100 and a coating film 1200 formed on one surface of the base material 1100.

The coating film 1200 includes a hydrophilic resin 1220, a metal compound 1240, a phosphoric acid-based compound 1260, and an amide-based crosslinking agent 1280. The metal compound 1240 that exhibits corrosion resistance may include two types of metal compounds. The coating film contains the phosphoric acid-based compound 1260 to improve bonding strength of the coating film with the base material 1100. Since the phosphoric acid-based compound 1260 has a strong bonding force with metals, the base material 1100 on which the coating film is able to be coated may include various metals, including aluminum. Furthermore, since the hydrophilic resin 1220 that exhibits hydrophilic properties is contained in the coating film, the crosslinking agent 1280 having an amide group which may cure the hydrophilic resin 1220 and may bind to the corrosion resistance component may be contained in the coating film.

As described in more detail below, the coating film 1200 according to the embodiments may be applied to the fins of the heat exchanger to enable heat exchange between the refrigerant pipe and the air around the fins. In order to increase heat exchange efficiency, the heat exchanger may be provided in a plural manner.

Figure 2:
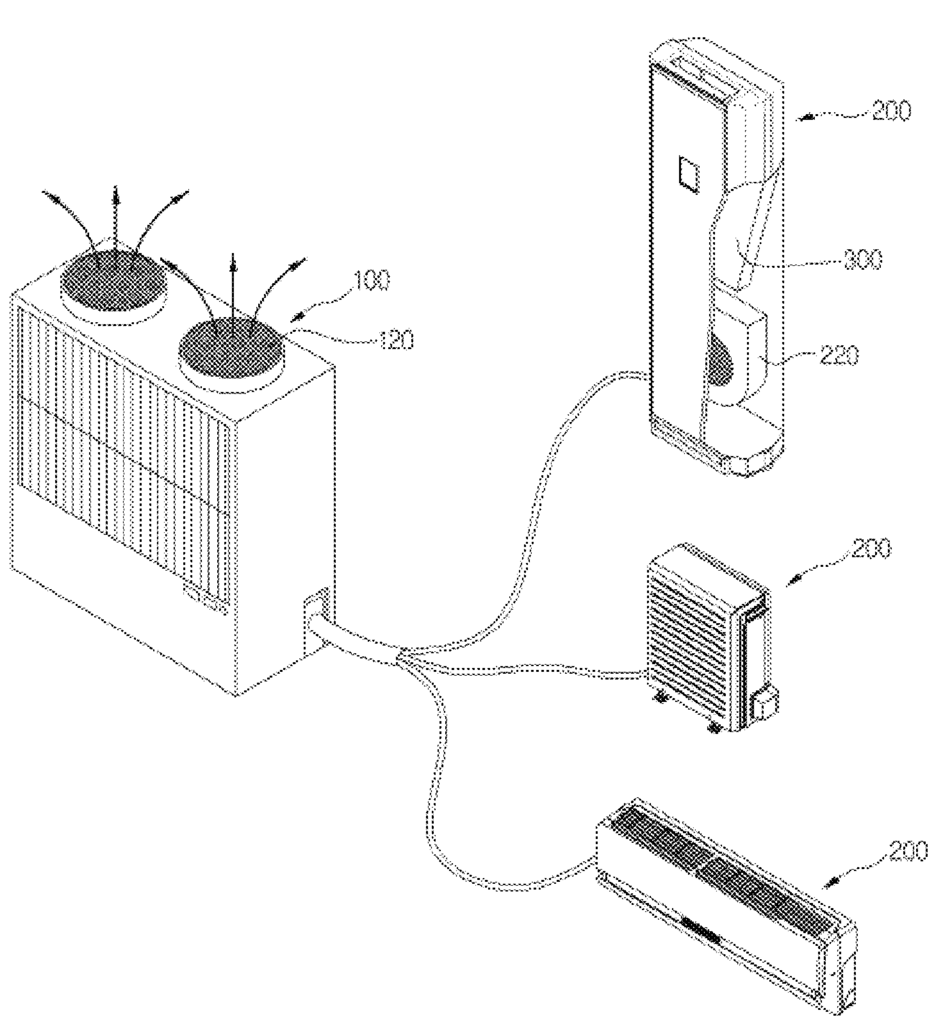
FIG. 2 is a schematic diagram showing a configuration of an air conditioner.

FIG. 2 is a diagram showing a configuration of an air conditioner. An example in which the air conditioner is of a stand type or a ceiling type as shown in the drawing will be described. However, the type of the air conditioner is not limited thereto, and may include a wall-mounted type, as well as an integrated type without distinction between an outdoor unit and an indoor unit. A type of the air conditioner is not limited to the drawing.

Referring to FIG. 2, the air conditioner includes an indoor unit 200 that discharges conditioned air indoors and an outdoor unit 100 that is connected to the indoor unit 200 and disposed outdoors. The outdoor unit 100 and the indoor unit 200 are connected to each other through a refrigerant pipe, so that cold air from the indoor unit 200 may be discharged indoors under the circulation of the refrigerant. The indoor unit 200 may be provided in a plural manner. Thus, a plurality of indoor units 200 may be connected to the outdoor unit 100.

Furthermore, the air conditioner includes the plurality of indoor units 200 and at least one outdoor unit 100 connected to the plurality of indoor units 200. The plurality of indoor units 200 and the outdoor unit 100 may be connected to each other through refrigerant pipes and may be connected to each other through communication cables and thus may be configured to transmit or receive a control command therebetween according to a predetermined communication scheme.

The indoor unit 200 includes an outlet for discharging heat-exchanged air. Additionally, the outlet may be provided with a wind direction control means that may open and close the outlet and control the direction of the discharged air. Furthermore, the indoor unit 200 may control an amount of air to be discharged from the outlet. In this regard, multiple vanes may be respectively installed in multiple air inlets and multiple air outlets. The vane may open and close at least one of the plurality of air inlets and the plurality of air outlets and guide the direction of air flow.

Furthermore, the indoor unit 200 may further include a display unit that displays the operating status and setting information of the indoor unit 200 and an input unit for inputting setting data. When the user inputs an operation command of the air conditioner through the input unit, the outdoor unit 100 may operate in a cooling mode or a heating mode in response to the input command. Furthermore, the outdoor unit 100 supplies refrigerant to the plurality of indoor units 100, and the air flow direction may be guided along the outlet of the indoor unit 100, so that the indoor environment may be adjusted.

Furthermore, embodiments disclosed herein provide a micro-channel type heat exchanger may comprise a plurality of flat tubes respective having a plurality of flow paths defined therein; each fin constructed to connect adjacent ones of the flat tubes to each other to conduct heat therebetween; and a coating film formed on at least one of each flat tube and each fin, wherein the coating film is made of a coating composition, wherein the coating composition may comprise a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder. The micro-channel type heat exchanger according to embodiments disclosed herein, which will be described in more detail below, may enable heat exchange between refrigerant and air around the flat tube and the fin, and may be provided in a plural manner to increase heat exchange efficiency.

Furthermore, embodiments disclosed herein provide a home or industrial apparatus using the above-described micro-channel type heat exchanger. A specific example provides an indoor or outdoor unit of various embodiments of the air conditioner using the micro-channel type heat exchanger as described above. However, embodiments are not limited to the indoor or outdoor unit of the air conditioner.

An indoor or outdoor unit of the air conditioner according to an embodiment may include a cabinet assembly having an inlet defined therein through which indoor air is sucked; and a heat exchanger disposed in the cabinet assembly and configured to exchange heat between the sucked indoor air and refrigerant, wherein the heat exchanger includes a micro-channel type heat exchanger, wherein a coating film is formed on a surface of at least one of a flat tube and a fin of the heat exchanger, wherein the coating film is made of a coating composition, wherein the coating composition comprises: hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Further, an indoor or outdoor unit of the air conditioner according to another embodiment may include a cabinet assembly having an inlet defined therein through which indoor air is sucked; and a heat exchange assembly disposed in the cabinet assembly and configured to exchange heat between the sucked indoor air and refrigerant, wherein the heat exchange assembly may include a first micro-channel type heat exchanger; a second micro-channel type heat exchanger stacked on top of the first heat exchanger; and a support disposed between the first micro-channel type heat exchanger and the second micro-channel type heat exchanger, wherein the support integrally couples the first micro-channel type heat exchanger and the second micro-channel type heat exchanger to each other, wherein the support supports the second heat exchanger thereon, wherein a coating film is formed on a surface of at least one of a flat tube and a fin of at least one the first micro-channel type heat exchanger and the second micro-channel type heat exchanger, wherein the coating film is made of a coating composition, wherein the coating composition comprises: a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Further, an indoor or outdoor unit of the air conditioner according to still another embodiment may include a cabinet assembly having an inlet defined therein through which indoor air is sucked; and a heat exchange assembly disposed in the cabinet assembly and configured to exchange heat between the sucked indoor air and refrigerant, wherein the heat exchange assembly includes a first micro-channel type heat exchanger; and a second micro-channel type heat exchanger disposed in rear of the first heat exchanger, wherein a coating film is formed on a surface of at least one of a flat tube and a fin of at least one the first micro-channel type heat exchanger and the second micro-channel type heat exchanger, wherein the coating film is made of a coating composition, wherein the coating composition may comprise a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Figure 3:
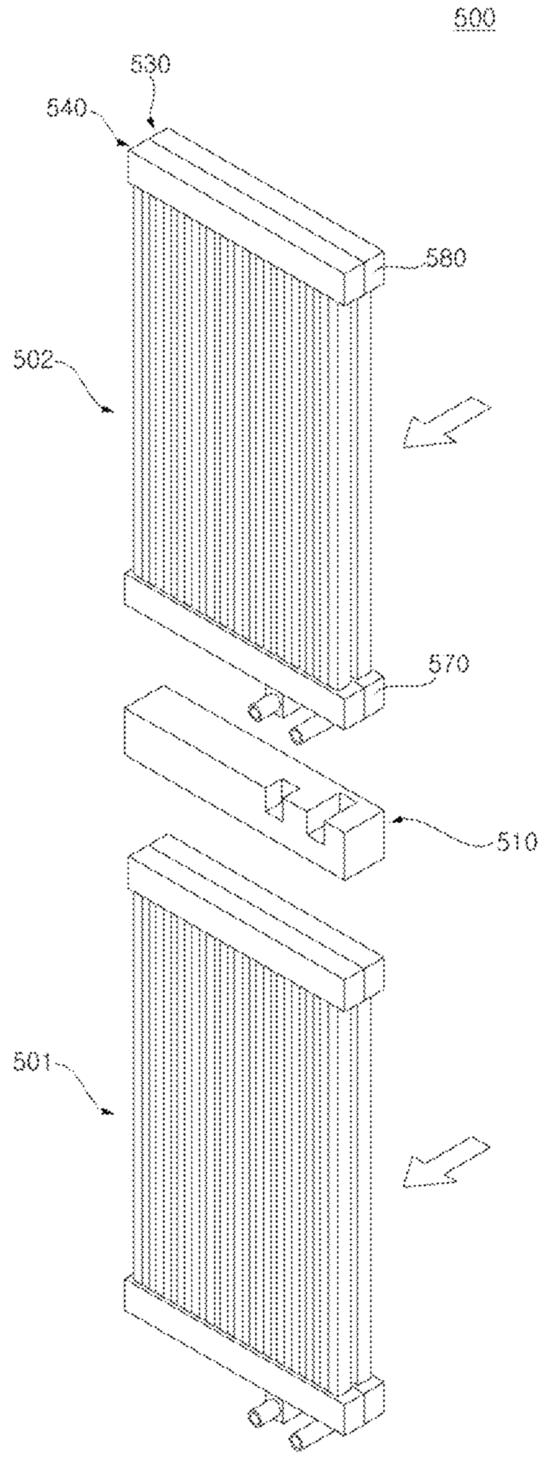
FIG. 3 is a perspective view showing a heat exchange assembly in indoor and outdoor units of an air conditioner according to the present disclosure.

FIG. 3 is a perspective view showing a heat exchange assembly according to an embodiment applied to the indoor or outdoor unit of an air conditioner according to embodiments disclosed herein. The heat exchange assembly 500 in the indoor/outdoor unit of the air conditioner according to the embodiments may be manufactured by manufacturing separately a first micro-channel type heat exchanger 501 and a second micro-channel type heat exchanger 502 and stacking the first micro-channel type heat exchanger 501 and the second micro-channel type heat exchanger 502 in a vertical direction.

The heat exchange assembly 500 may have a cabinet assembly (not shown) having a large sized air inlet defined in a rear surface thereof through which indoor or outdoor air is sucked. The large sized air inlet may face the first micro-channel type heat exchanger 501 and the second micro-channel type heat exchanger 502. The large sized air inlet may be applied to the heat exchange assembly 500 without modifying the structure of the heat exchange assembly 500.

When two heat exchangers, each having a height larger than a width, are stacked vertically, the heat exchange assembly 500 may include a support 510 disposed between the first micro-channel type heat exchanger 501 and the second micro-channel type heat exchanger 502 so as to stably couple the first micro-channel type heat exchanger 501 and the second micro-channel type heat exchanger 502 to each other. A piping connection may be into the support 510 to safely protect the piping connection.

The heat exchange assembly 500 may include the stack of the two heat exchangers, each having a height larger than a width, thereby eliminating pressure imbalance occurring between pressures of upper and lower refrigerants. The first heat exchanger 501 and the second heat exchanger 502 may be manufactured to have the same structure.

Figure 4:
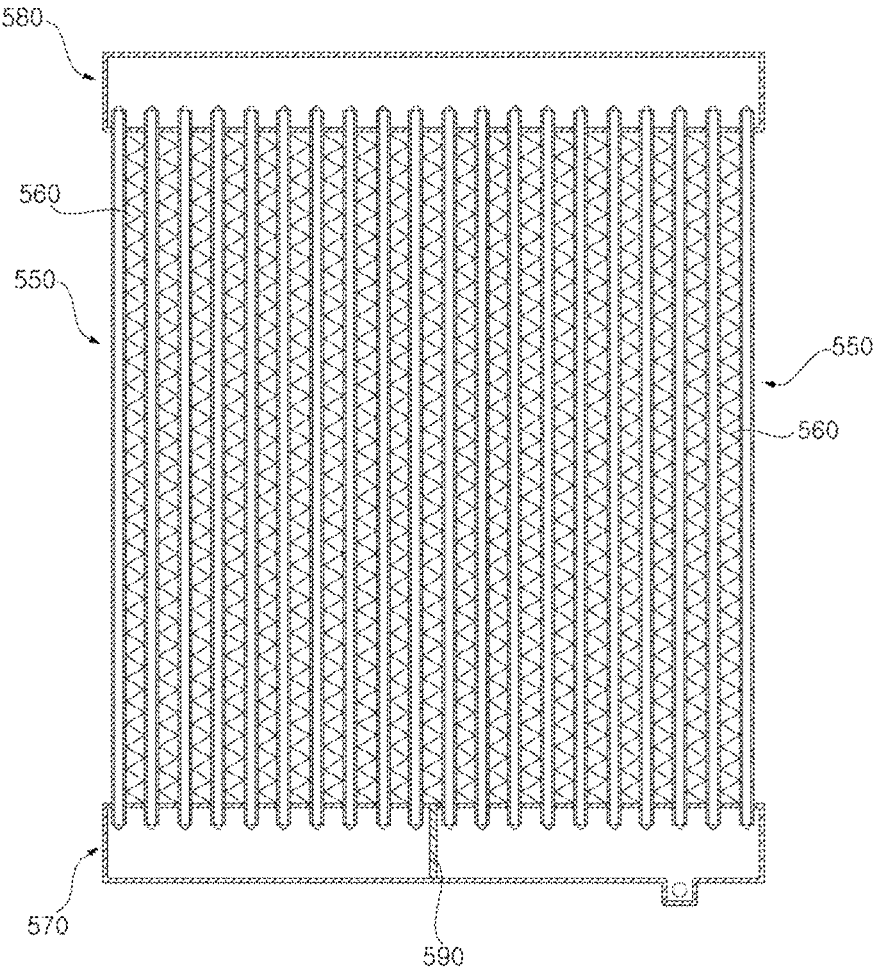
FIG. 4 is a cross-sectional view showing a micro-channel type heat exchanger according to the present disclosure.

FIG. 4 is a cross-sectional view showing a micro-channel type heat exchanger according to an embodiment. A detailed structure of the first heat exchanger 501 will be described by way of example. The first heat exchanger 501 includes a first heat exchanger 530 that exchanges heat with air, and a second heat exchanger 540 that is disposed in rear or front of the first heat exchanger 530 and exchanges heat with air. Each of the first heat exchanger 530 and the second heat exchanger 540 may be manufactured integrally in a furnace Each of the first heat exchanger 530 and the second heat exchanger 540 may be embodied as a micro-channel type heat exchanger. Each of the first heat exchanger 530 and the second heat exchanger 540 may be made of aluminum.

The first heat exchanger 530 includes an array of a plurality of flat tubes 550 respectively having a plurality of flow paths defined therein, each fin 560 that connects adjacent ones of the flat tubes 550 and conducts heat therebetween, a first lower header 570 coupled to one side of the array of the plurality of flat tubes 550 and in communication with one side of the array of the plurality of flat tubes 550, wherein refrigerant flows in the first lower header 570, and a first upper header 580 coupled to the other side of the array of the plurality of flat tubes 550 and communicating with the other side of the array of the plurality of flat tubes 550, wherein refrigerant flows in the first upper header 580. Further, a baffle 590 is disposed in at least one of the first lower header 570 or the first upper header 580 so as to partition an inner space thereof into two spaces such that the refrigerant is prevented from flowing between the two spaces.

The flat tube 550 has defined therein a flow path through which the refrigerant flows. The flow path extends in an elongate manner in the longitudinal direction of the flat tube. The flat tube 550 extends vertically, and the plurality of flat tubes 550 are arranged in the horizontal direction to form the array. The refrigerant flows along the longitudinal direction of the flat tube 550.

The lower side of the flat tube 550 is inserted into and communicates with the first lower header 570. The upper side of the flat tube 550 is inserted into and communicates with the first upper header 580. The fin 560 may extend in a bent manner and connects two flat tubes 550 adjacent to each other to conduct heat therebetween.

The flow path along the air flows through the micro-channel type heat exchanger 501 is described as follows. First, the air having flowed through an indoor fan may flow to the heat exchanger 501. Specifically, air having flowed through the indoor fan may flow to a space formed between the plurality of fins 560. The air having flowed into the space may exchange heat with the refrigerant flowing along the flat tube 550.

During the winter, frost may occur on the outer surface of the plurality of fins 560. That is, the refrigerant flowing along the flat tube 550 and the air flowing under the operation of the indoor fan may have different temperatures. Additionally, the difference between the temperatures of the refrigerant and the air may become even larger in the winter. Accordingly, a composite coating film according to the embodiments may be formed on the fin 560 and the flat tube 550. The composite coating film may entirely cover the outer surface of the fin 560 and the flat tube 550.

Hereinafter, embodiments will be described in more detail through the coating film according to an embodiment. These embodiments are merely presented as examples to describe the embodiments in more detail. Therefore, embodiments are not limited to these examples.

Present Examples 1 to 6: Coating Film Production

1. Air Blowing on Aluminum Metal

An air blowing process was performed to clean a surface of the aluminum metal.

2. Preparation of Coating Composition

A coating composition was prepared by mixing a hydrophilic acrylic resin, a metal compound including Cr and Zr, a phosphate-based compound, an amide-based crosslinking agent, a preservative, and water with each other. Specifically, the hydrophilic resin as used was a resin polymerized using hydroxy-ethyl-acrylate, methacrylic acid, acrylic acid, and polyoxyethylene ethyl phosphate.

At room temperature, the hydrophilic acrylic resin was added to ion-exchange water, and then zirconium hydrofluoric acid, chromium nitrate, and a cross-linking agent having an amide group were added thereto in this order. Afterwards, a phosphoric acid-based compound was added thereto. Finally, sorbic acid was added thereto to complete the preparation of the composition.

Table 1 as set forth below specifically shows the contents of the components contained in the coating compositions of each of Present Examples 1 to 6.

TABLE 1

| Ingredients (% by weight) | | Present Example 1 | Present Example 2 | Present Example 3 | Present Example 4 | Present Example 5 |
|---|---|---|---|---|---|---|
| hydrophilic resin | | 11 | 15 | 18 | 21 | 25.5 |
| Metal compound | chrome compound | 0.5 | 1.5 | 2 | 2.5 | 3.5 |
| | zirconium compound | 0.5 | 1.5 | 2 | 2.5 | 3.5 |
| Amide-based crosslinking agent | | 0.5 | 0.7 | 1 | 1.5 | 2.5 |
| Phosphoric acid compound | | 1 | 1.5 | 2 | 3 | 3.5 |
| Sorbic acid | | 0.1 | 0.1 | 0.1 | 0.1 | 0.1 |
| Water (ion exchanged water) | | Remainder | Remainder | Remainder | Remainder | Remainder |

3. Formation of Coating Film

An aluminum specimen of a size (10×10 cm, thickness 0.1 mm) was prepared. The aluminum specimen was immersed in a paint tank containing the coating composition prepared according to each of the above Present Examples for 1 minute, and then natural deliquification was performed thereon using gravity for 2 minutes. Afterwards, the specimen was dried in a dryer at a temperature of 175° C. for 180 seconds to prepare a specimen with a coating film formed thereon.

Manufacturing of Coating Film According to Comparative Example

1. Preparation of Coating Composition According to Comparative Example

Five (5) g of potassium persulfate was added to 60 g of deionized water and completely dissolved while stirring at 20 rpm at 70° C. to prepare a solution of a water-soluble ionic initiator, and then the temperature thereof was raised to 80° C. A mixed solution of 10 g of 2-hydroxy-ethyl-acetate, 5 g of methacrylic acid, and 55 g of sodium 1-allyloxy-2-hydroxypropane-sulfonate was added dropwise to the water-soluble ionic initiator at 80° C. over 3 hours, and the reaction was maintained for 1 hour. A solution in which 5 g of potassium persulfate was dissolved in 5 g of deionized water was prepared and, then, was added dropwise thereto over 30 minutes while stirring at 50 rpm. After additional stirring for 10 minutes, the stirring speed was lowered to 20 rpm, and the reaction was maintained for 50 minutes. Then, polymerization was completed to prepare a hydrophilic resin.

The hydrophilic resin prepared in the above preparation example was added to ion-exchange water at room temperature, and then, an amide-based crosslinking agent was added thereto. Next, zirconium hydrofluoric acid, chromium nitrate, and sodium metavanadate were added thereto in this order. Afterwards, the epoxy silane compound catalyst was added first thereto, and then, the amino silane compound catalyst was added thereto. Finally, phytoncide was added thereto to complete the preparation of a treatment solution.

TABLE 2

| | Ingredients (% by weight) | | Comparative Example |
|---|---|---|---|
| Coating composition | Hydrophilic resin | | 10 |
| | Formamide | | 4 |
| | Metal compound | zirconium compound | 2 |
| | | chrome compound | 1 |
| | Sodium Metavanadate | | 0.5 |
| | 3-Glycidoxypropyltrimethoxysilane | | 0.15 |
| | 3-Aminopropyltrimethoxysilane | | 0.05 |
| | Phytoncide | | 5 |
| | Water (ion exchange water) | | Remainder |

Experimental Example 1: Analysis of Hydrophilicity of Coating Film

The hydrophilicity of the coating film according to the embodiments was analyzed, and the results are shown in Table 3 as set forth below. First, the water contact angle was measured before and after forming the coating film according to the embodiments on the aluminum surface. The water contact angle is the surface contact angle measured after dropping 10 μℓ of distilled water.

Before the coating film according to embodiments is formed on the aluminum surface, the water contact angle is 81°. Thus, the water spreadability is small, so that a water spread diameter is small. However, when the composite coating film according to the embodiments is formed on the aluminum surface, the hydrophilicity is improved such that the spreadability of water is high. Thus, when distilled water is dropped thereon, the contact angle is as low as 25° or smaller and thus, the water spread diameter is large.

Furthermore, the hydrophilic performance evaluation of the composite coating film according to the embodiments was performed, and the results are shown in the Table 3. The coating amount of the coating film per sample area was calculated using the weight difference before and after the coating.

Bare hydrophilicity was measured by dropping 10 μℓ of distilled water on the coating film as soon as the coating film was coated, and measuring the water spread diameter. Initial hydrophilicity was analyzed by immersing the coating film in distilled water for 10 minutes and drying for 10 minutes, which is one cycle. After 10 cycles, 10 μℓ of distilled water was dropped on the surface of the coating film and the water spread diameter was measured with a vernier caliper. Sustained hydrophilicity was analyzed by performing 300 cycles, and then dropping 10 μℓ of distilled water on the surface of the coating film, and measuring the water spread diameter with a vernier caliper.

TABLE 3

| | | Examples | | | |
|---|---|---|---|---|---|
| | | Comparative Example | Present Example 3 | | |
| | | Coating amount | | | |
| | | 0.2 g/m$^2$ | 0.1 g/m$^2$ | 0.5 g/m$^2$ | 1.0 g/m$^2$ |
| Hydrophilicity | Original hydrophilicity | ◎ | ○ | ○ | ○ |
| | Initial hydrophilicity | X | ○ | ○ | ○ |
| | Sustained hydrophilicity | X | ○ | ○ | ○ |

In Table 3 above, symbol ◎: water spread diameter is 10 mm or larger, symbol ○: water spread diameter is in a range of 7 to 10 mm, symbol X: water spread diameter is 7 mm or smaller. Table 3 above shows the result of measuring the hydrophilicity based on the coating amount in the coating film according to embodiments disclosed herein. It may be identified based on the table 3 that when compared with the Comparative Example, the original hydrophilicity, initial hydrophilicity, and sustained hydrophilicity of the composite coating film according to the embodiments are excellent.

Experimental Example 2: Analysis of Corrosion Resistance of Coating Film Based on Experimental Time The corrosion resistance of the composite coating film according to the embodiments based on the test time was analyzed, and the results are shown in Table 4 as set forth below. The corrosion resistance of the coating film was tested using an acidic brine spray test (SWAAT, ASTM G85-A3) that simulates a marine environment containing acid components. The solution contains 4.2% NaCl and 1% $CH_3COOH$. The acidity thereof was pH of 2.8 to 3.0, and the cycle condition: solution spraying for 30 minutes (49° C.) and exposure to wet atmosphere for 1 hour and 30 minutes (49° C.). This cycle was repeated.

Furthermore, the acidic brine spray test for the corrosion resistance analysis was conducted for the time shown in Table 4 below, and the corrosion performance was evaluated based on the rating number (R.N.) method of the coating film.

TABLE 4

| Examples | Comparative Example | | | Present Example 3 | | | | | |
|---|---|---|---|---|---|---|---|---|---|
| Coating amount | 0.2 | 0.4 | 0.6 | 0.1 | 0.3 | 0.5 | 0.7 | 1.0 | 1.5 |
| Corrosion resistance (SWAAT 72 hr) | X | Δ | Δ | ◎ | ◎ | ◎ | ◎ | ◎ | ○ |

In Table 4 above, symbol ◎: R.N. is 9.8 or higher, symbol ○: R.N. is in a range of 8 to 9.5, symbol Δ: R.N. is in a range of 7 to 8, symbol X: R.N. is 6 or smaller.

Referring to Table 4 above, the R.N. is expressed according to the corrosion area percentage of the coating film. The Comparative Examples exhibits R.N of 8.0 or smaller (corrosion area percentage is in a range of 0.10% to 0.25%) at all coating amounts. The composite coating film according to the embodiments exhibits an R.N of 9.5 or greater (corrosion area percentage is smaller than 0.02%) at all coating amounts. Therefore, it may be identified that the composite coating film according to the embodiments may maintain the corrosion resistance for a long time.

Experimental Example 4: Evaluation of Hydrophilic Performance Based on Change in Type of Crosslinking Agent The biggest difference between the coating composition according to the example and the coating composition according to the Comparative Example is that the type of the crosslinking agent in the coating composition according to the example is different from the type of the crosslinking agent in the coating composition according to the Comparative Example. The coating composition according to the example may include the phosphoric acid-based compound as an additional cross-linking agent, while the coating composition according to the Comparative Example includes a silane compound as an additional cross-linking agent.

Water rubbing tests and hydrophilicity tests were performed on the coating compositions of the Present Examples and Comparative Examples having different crosslinking agents. The water rubbing test is a test to check whether the coating film peels off, and change in hydrophilicity based on a result of rubbing the surface of the coating film five times using a cloth soaked in water. The hydrophilicity test was conducted by measuring the water spread diameter after dropping 0.1 μℓ of distilled water on the surface of the sample.

The test results are listed in Table 5 as set forth below.

TABLE 5

| | Comparative Example | Present Example 3 | |
|---|---|---|---|
| Test item | 0.2 g/m$^2$ | 0.1 g/m$^2$ | 0.3 g/m$^2$ |
| Water rubbing (whether film peels off) | ○ (Peel off) | X (No peel off) | X (No peel off) |
| Hydrophilicity test | 5.7 mm | 6.7 mm | 6.8 mm |

As may be seen in Table 5, in the Comparative Example using a silane compound, the coating film peels off after the water rubbing test. Further, as a result of the hydrophilicity test, the water spread diameter was measured as 5.7 mm.

However, in the Present Example using a phosphoric acid-based compound, there was no peeling off of the coating film even after the water rubbing test. Further, as a result of the hydrophilicity test, the water spread diameter was measured to be 6.7 mm or larger, thus confirming that the hydrophilicity of the coating film is good. Embodiments disclosed herein provide a coating composition that may simultaneously impart hydrophilicity and corrosion resistance to a base material such as metal and a coating film made of the coating composition.

Embodiments disclosed herein also provide a micro-channel type heat exchanger in which a coating film that is both hydrophilic and corrosion-resistant is formed to improve hydrophilicity and corrosion resistance, such that the condensate drainage effect of the micro-channel type heat exchanger may be improved.

Embodiments disclosed herein further provide indoor and outdoor units of an air conditioner in which a coating film that is both hydrophilic and corrosion-resistant is formed to improve hydrophilicity and corrosion resistance, such that the condensate drainage effect of the indoor and outdoor unit of the air conditioner may be improved.

Purposes according to embodiments disclosed herein are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

In order to achieve the above-mentioned technical purposes, embodiments disclosed herein may provide a coating composition capable of simultaneously imparting corrosion resistance and hydrophilicity to a surface of a base material such as metal. The coating composition specifically includes a hydrophilic resin, a metal compound, an amide-based crosslinking agent, as well as a phosphoric acid-based compound and a preservative.

Specifically, the coating composition of the embodiments disclosed herein may include a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Further, embodiments disclosed herein provide a micro-channel type heat exchanger comprising: a plurality of flat tubes respective having a plurality of flow paths defined therein; each fin constructed to connect adjacent ones of the flat tubes to each other to conduct heat therebetween; and a coating film formed on at least one of each flat tube and each fin, wherein the coating film is made of a coating composition, wherein the coating composition comprises: a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Embodiments disclosed herein also provide an indoor or outdoor unit of the air conditioner comprising: a cabinet assembly having an inlet defined therein through which indoor air is sucked; and a heat exchanger disposed in the cabinet assembly and configured to exchange heat between the sucked indoor air and refrigerant, wherein the heat exchanger includes a micro-channel type heat exchanger, wherein a coating film is formed on a surface of at least one of a flat tube and a fin of the heat exchanger, wherein the coating film is made of a coating composition, wherein the coating composition comprises: a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Embodiments disclosed herein further provide an indoor or outdoor unit of the air conditioner comprising: a cabinet assembly having an inlet defined therein through which indoor air is sucked; and a heat exchange assembly disposed in the cabinet assembly and configured to exchange heat between the sucked indoor air and refrigerant, wherein the heat exchange assembly may include a first micro-channel type heat exchanger; a second micro-channel type heat exchanger stacked on top of the first heat exchanger; and a support disposed between the first micro-channel type heat exchanger and the second micro-channel type heat exchanger, wherein the support integrally couples the first micro-channel type heat exchanger and the second micro-channel type heat exchanger to each other, wherein the support supports the second heat exchanger thereon, wherein a coating film is formed on a surface of at least one of a flat tube and a fin of at least one the first micro-channel type heat exchanger and the second micro-channel type heat exchanger, wherein the coating film is made of a coating composition, wherein the coating composition comprises: a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Embodiments disclosed herein furthermore provide an indoor or outdoor unit of the air conditioner comprising: a cabinet assembly having an inlet defined therein through which indoor air is sucked; and a heat exchange assembly disposed in the cabinet assembly and configured to exchange heat between the sucked indoor air and refrigerant, wherein the heat exchange assembly includes a first micro-channel type heat exchanger; and a second micro-channel type heat exchanger disposed in rear of the first heat exchanger, wherein a coating film is formed on a surface of at least one of a flat tube and a fin of at least one the first micro-channel type heat exchanger and the second micro-channel type heat exchanger, wherein the coating film is made of a coating composition, wherein the coating composition comprises: a hydrophilic resin at 10 to 40% by weight; a metal compound at 1 to 10% by weight; an amide-based crosslinking agent at 0.5 to 5% by weight; a phosphoric acid-based compound at 1 to 5% by weight; a preservative at 0.1 to 3% by weight; and water as a remainder.

Conventionally, at least two or more coating films respectively having the corrosion resistance and the hydrophilicity are formed on the surface of the base material in order to impart the corrosion resistance and the hydrophilicity to the surface of the base material. However, using the coating composition according to the present disclosure, a single coating film that has both corrosion resistance and hydrophilic properties may be formed, thereby improving product performance and lifespan at low cost.

Furthermore, the metal compound that exhibits the corrosion resistance in the coating film according to the present disclosure may include two or more types thereof, such that the corrosion resistance may be improved. Furthermore, the coating film according to the present disclosure contains the phosphate-based compound and thus has a strong bonding force with the base material such as metal and thus may be applied to various types of base materials.

In addition to the above effects, specific effects of embodiments are described together while describing specific details for carrying out the present disclosure. As described above, the embodiments have been described with reference to illustrative drawings, but the present disclosure is not limited by the embodiments and drawings disclosed in this specification, and is within the scope of the technical idea of the present disclosure. It is obvious that various modifications may be made by those skilled in the art.

As described above, the embodiments have been described with reference to illustrative drawings. However, the present disclosure is not limited by the embodiments and drawings as disclosed in the present disclosure. It is obvious that various modifications may be made thereto by technicians related to the present disclosure without departing from technical ideas. In addition, it is appreciated that although the effect of the configuration is not explicitly set forth while describing the embodiment, effects predictable from the configuration should also be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A micro-channel type heat exchanger, comprising:

a plurality of tubes having a plurality of flow paths defined therein;

a plurality of fins, each of the plurality of fins connecting adjacent ones of the tubes to each other to conduct heat therebetween; and a coating film formed on at least one of the tubes or the fins, wherein the coating film is made of a coating composition including:

a hydrophilic resin in an amount of 10 to 40% by weight;

a metal compound in an amount of 1 to 10% by weight:

an amide-based crosslinking agent in an amount of 0.5 to 5% by weight;

a phosphoric acid-based compound in an amount of 1 to 5% by weight;

a preservative in an amount of 0.1 to 3% by weight; and water.

2. The micro-channel type heat exchanger of claim 1, wherein the hydrophilic resin includes a material selected from an acrylic functional group.

3. The coating-composition micro-channel type heat exchanger of claim 1, wherein the hydrophilic resin includes at least one of acrylic acid ($C_3H_4O_2$), methacrylic acid ($C_4H_6O_2$), methyl (meth)acrylate ($CH_8O_2$), ethyl (meth) acrylate ($C_9H_{12}N_2O_2$), butyl (meth)acrylate ($C_8H_{14}O_2$), dimethylaminoethyl (meth)acrylate ($C_8H_{15}NO_2$), isobutyl (meth)acrylate ($C_8H_{14}O_2$), t-butyl (meth)acrylate ($C_8H_{14}O_2$), cyclohexyl (meth)acrylate ($C_{10}H_{16}O_2$), ethylhexyl (meth)acrylate ($C_{12}H_{22}O_2$), (meth)acrylic ester monomer ($C_7H_{10}O_3$), 2-hydroxyethyl acrylate ($C_5H_8O_3$), or hydroxyethyl (meth)acrylate ($C_6H_{10}O_3$).

4. The micro-channel type heat exchanger of claim 1, wherein the metal compound includes at least one of zirconium (Zr) or titanium (Ti).

5. The micro-channel type heat exchanger of claim 1, wherein the metal compound includes at least two metal elements of chromium (Cr), zirconium (Zr), or titanium (Ti).

6. The micro-channel type heat exchanger of claim 1, wherein the amide-based crosslinking agent includes at least one of formamide ($CH_3NO$), sodium amide ($H_2NNa$), nicotinic acid amide ($C_6H_6N_2O$), dimethylformamide ($C_3H_7NO$), acetamide ($C_2H_5NO$), acrylamide ($C_3H_5NO$), polyacrylamide ($C_6H_9NNaO_3$), potassium amide ($H_2KN$), oxamide ($C_2H_4N_2O_2$), lithium diethylamide ($C_4H_{10}LiN$), dimethylformamide ($C_3H_7NO$), benzamide ($C_7H_7NO$), iodoacetamide ($C_2HAINO$), acetamide ($C_2H_5NO$), arylamide ($C_3H_5NO$), phenylacetamide ($C_8H_9NO$), cyanoacetamide ($C_3H_4N_2O$), dicyanoacetamide ($C_4H_4N_3O$), dimethylacetamide ($C_4H_9NO$), diethylchloroacetamide ($C_6H_{12}ClNO$), dimethylformamide ($C_3H_7NO$), glycinamide ($H_2NCH_2CNH_2$), isopropylacrylamide ($C_6H_{11}NO$), methacrylamide ($C_4H_7NO$), methylenebisacrylamide ($C_7H_{10}N_2O_2$), nicotinamide ($C_6H_6N_2O$), oleamide ($C_{18}H_{35}NO$), oxamide ($C_2H_4N_2O_2$), sulfonylamide ($C_6H_8N_2O_2S$), or thioacetamide ($C_2H_5NS$).

7. The micro-channel type heat exchanger of claim 1, wherein the phosphoric acid-based compound includes at least one of phosphoric acid ($H_3PO_4$), pyrophosphoric acid ($H_4P_2O_1$), polyphosphoric acid ($HO[PO_2OH]_nH$), potassium hydrogen orthophosphate ($K_2HPO_4$), tetrasodium inorganic phosphate ($Na_4P_2O_1$), disodium pyrophosphate ($Na_2H_2P_2O_7$), free potassium phosphate, phosphorus pentoxide ($P_4O_{10}$), zinc phosphate ($Zn_3(PO_4)_2$), manganese phosphate ($Mn_3(PO_4)_2$), iron phosphate ($FePO_4$), trimetaphosphoric acid ($H_3O_9P_3$), tripolyphosphoric acid ($H_5P_3O_{10}$), or tetrapolyphosphoric acid ($H_6O_{13}P_4$).

8. The micro-channel type heat exchanger of claim 1, wherein the preservative includes an organic acid.

9. The micro-channel type heat exchanger of claim 1, wherein the preservative imparts a fragrance.

10. The micro-channel type heat exchanger of claim 1, wherein the preservative includes at least one of citric acid ($C_6H_8O_7$), lactic acid ($C_3H_6O_3$), sorbic acid ($C_6H_8O_2$), or a combination thereof.

11. The micro-channel type heat exchanger of claim 1, wherein a coating amount of the coating film is in a range of 0.10 to 1.50 g/m2.

12. An indoor or outdoor unit of an air conditioner comprising:

a cabinet assembly having an inlet defined therein through which indoor air is sucked; and a heat exchanger disposed in the cabinet assembly and configured to exchange heat between the sucked indoor air and refrigerant, wherein the heat exchanger includes a micro-channel type heat exchanger, wherein a coating film is formed on a surface of at least one of a flat tube or a fin of the heat exchanger, wherein the coating film is made of a coating composition including:

a hydrophilic resin in an amount of 10 to 40% by weight;

a metal compound in an amount of 1 to 10% by weight;

an amide-based crosslinking agent in an amount of 0.5 to 5% by weight;

a phosphoric acid-based compound in an amount of 1 to 5% by weight;

a preservative in an amount of 0.1 to 3% by weight; and water.

13. The indoor or outdoor unit of the air conditioner of claim 12, wherein the heat exchange assembly includes:

a first micro-channel type heat exchanger;

a second micro-channel type heat exchanger positioned over the first heat exchanger; and a support disposed between the first micro-channel type heat exchanger and the second micro-channel type heat exchanger, wherein the support integrally couples the first micro-channel type heat exchanger and the second micro-channel type heat exchanger, wherein the support supports the second heat exchanger thereon.

14. The indoor or outdoor unit of the air conditioner of claim 12, wherein the heat exchange assembly includes a first micro-channel type heat exchanger; and a second micro-channel type heat exchanger disposed in rear of the first heat exchanger.

* * * * *